Figure 1:
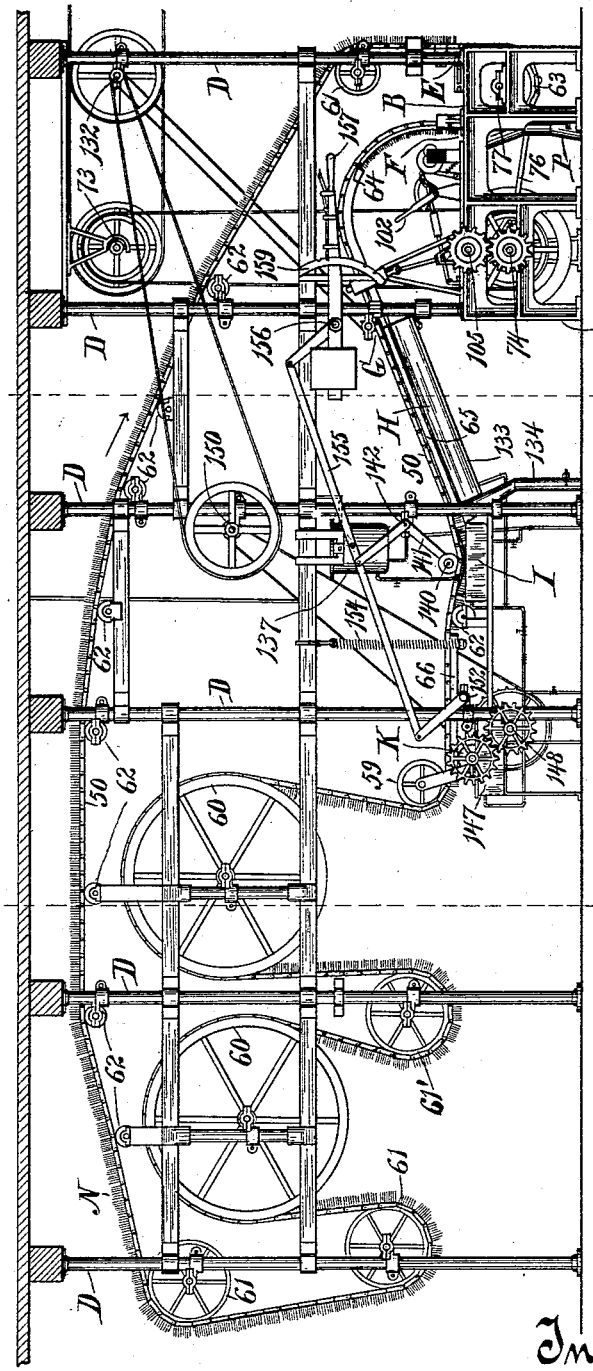

(No Model.) 20 Sheets—Sheet 1.
W. H. WYMAN.
MATCH MAKING MACHINE.

No. 570,529. Patented Nov. 3, 1896.

Witnesses.
O. H. Keeney.
Anna O. Faust.

Inventor.
William H. Wyman
By Benedict Morsell
Attorneys.

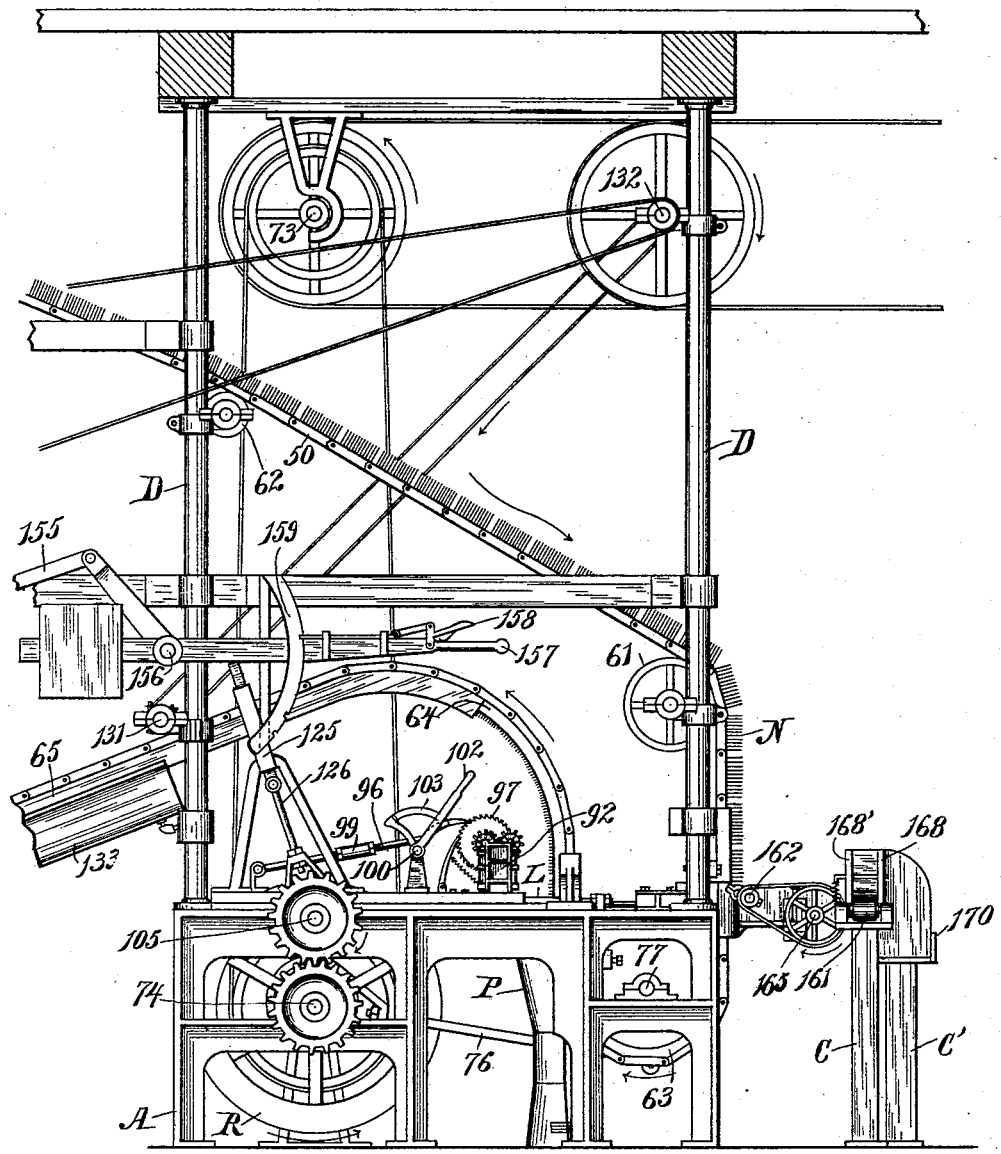

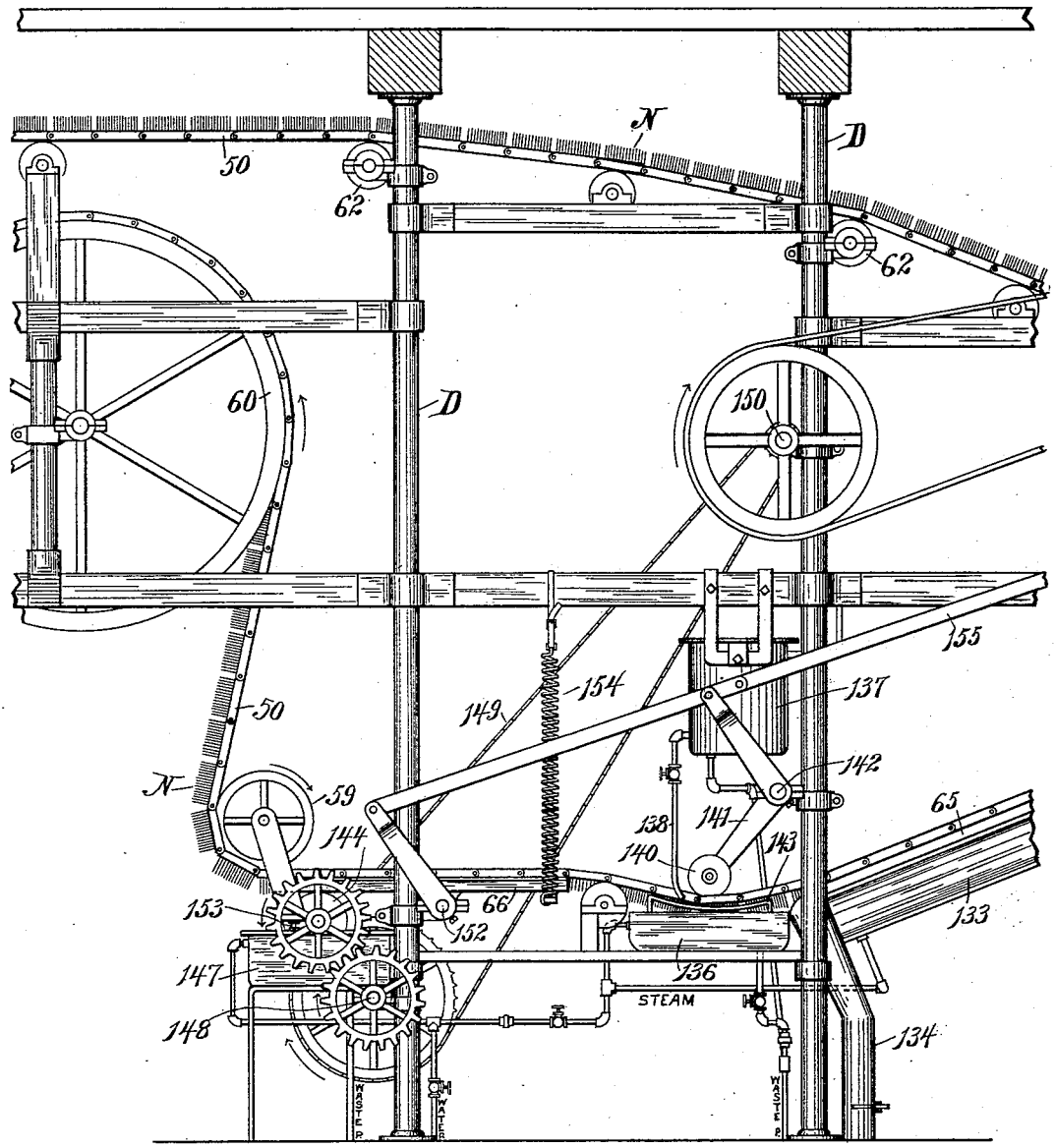

(No Model.)  
20 Sheets—Sheet 4.
W. H. WYMAN.
MATCH MAKING MACHINE.
No. 570,529. Patented Nov. 3, 1896.
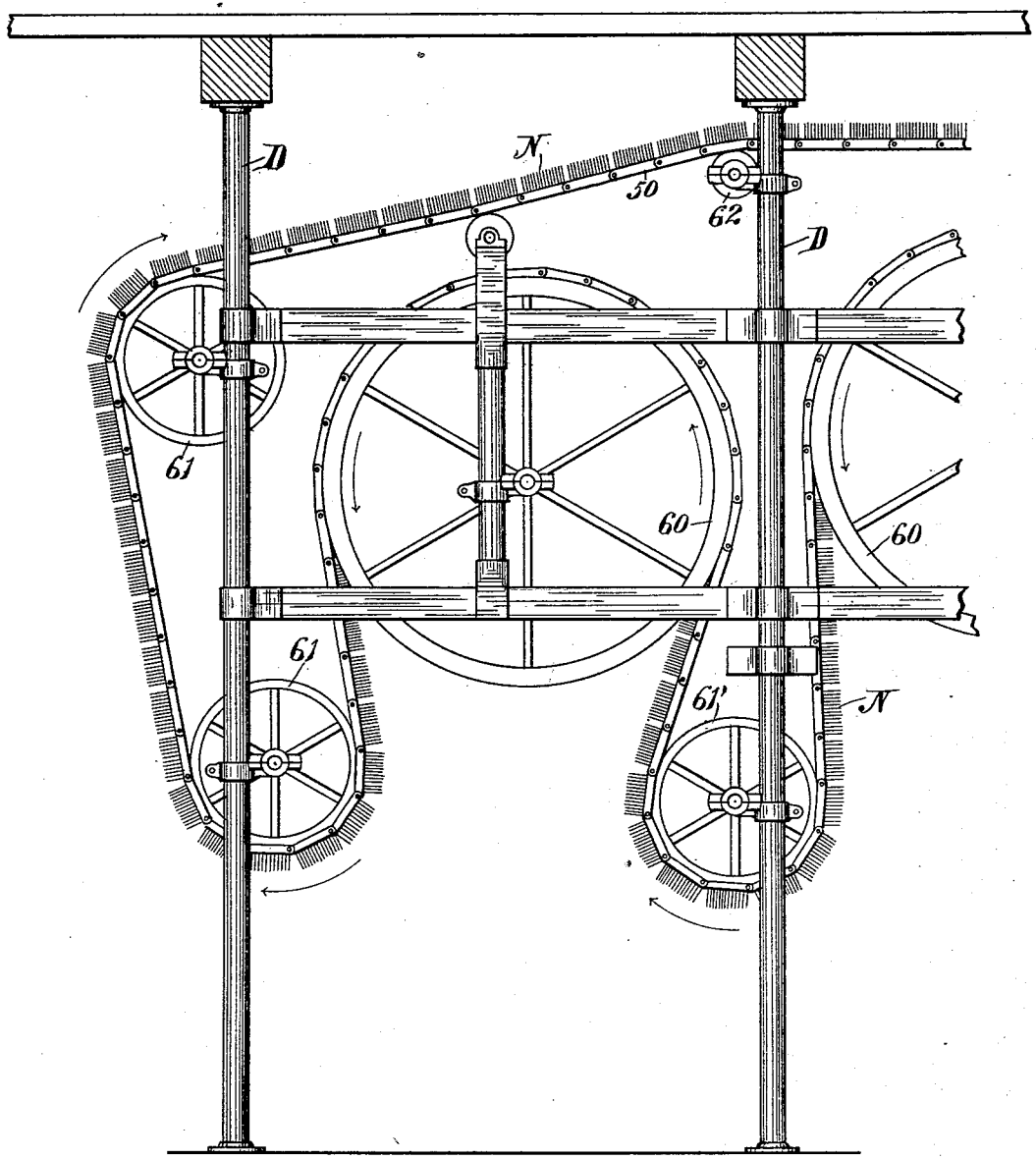

(No Model.)　　　　W. H. WYMAN.　　　20 Sheets—Sheet 5.
MATCH MAKING MACHINE.
No. 570,529.　　　　　　　　Patented Nov. 3, 1896.
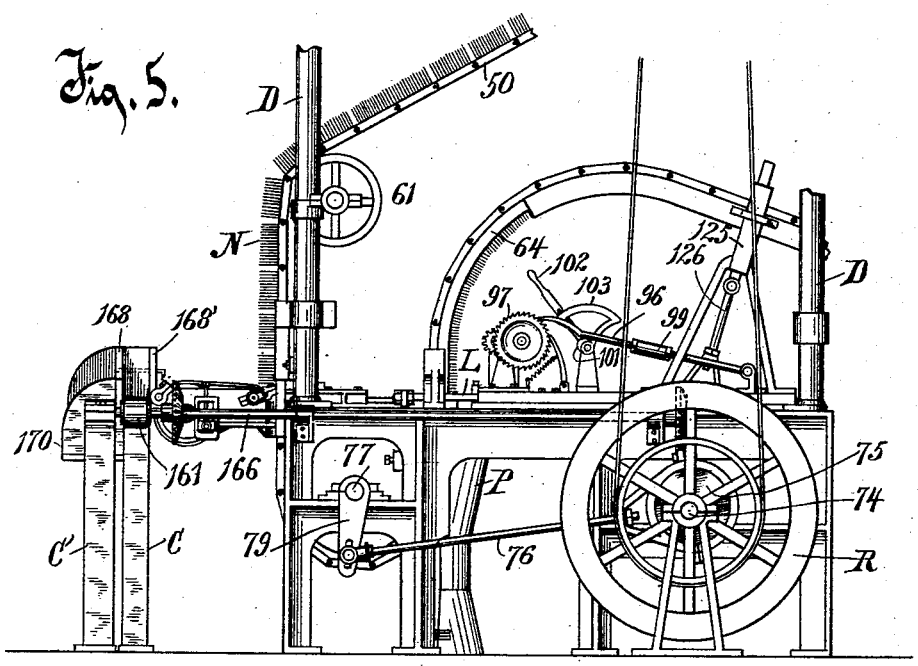
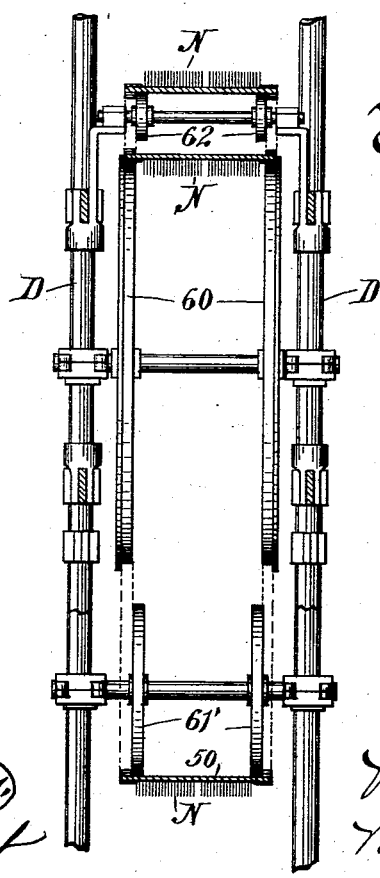

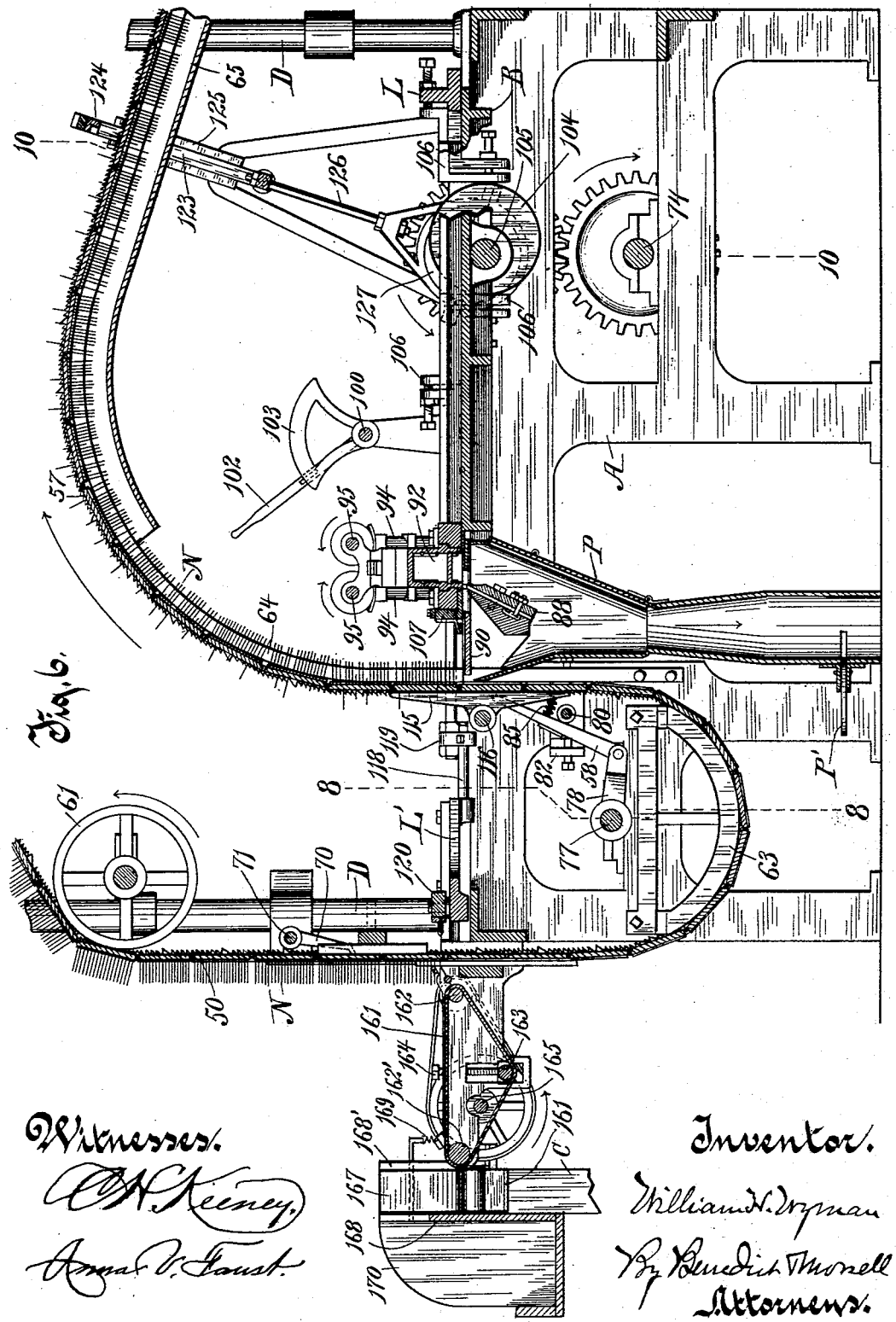

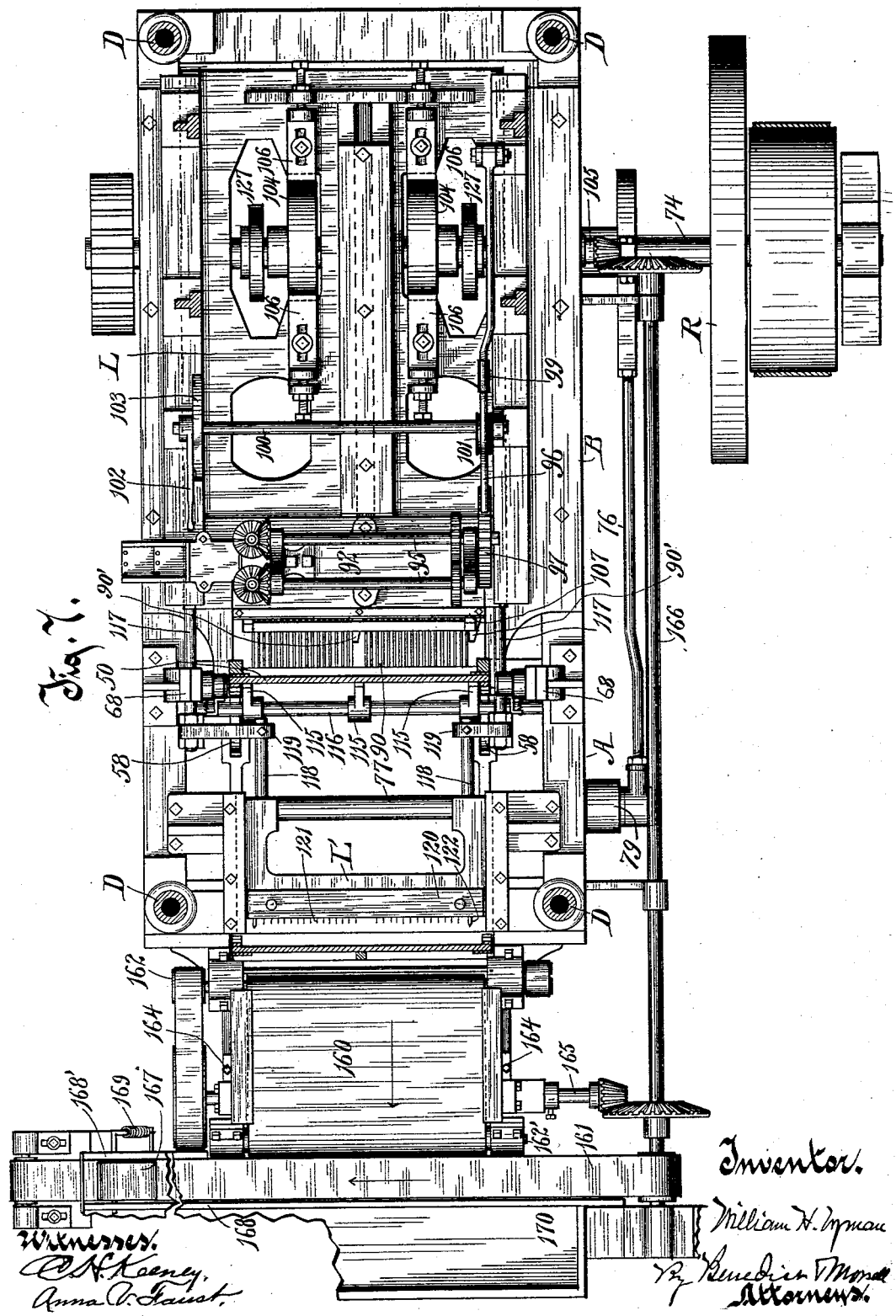

(No Model.) 20 Sheets—Sheet 8.
W. H. WYMAN.
MATCH MAKING MACHINE.

No. 570,529. Patented Nov. 3, 1896.

Witnesses. Inventor.
William H. Wyman
By Benedict Morsell
Attorneys.

(No Model.)  20 Sheets—Sheet 9.

W. H. WYMAN.
MATCH MAKING MACHINE.

No. 570,529. Patented Nov. 3, 1896.

Witnesses.

Inventor.
William H. Wyman
By Benedict Morsell
Attorneys.

(No Model.) 20 Sheets—Sheet 10.
W. H. WYMAN.
MATCH MAKING MACHINE.
No. 570,529. Patented Nov. 3, 1896.
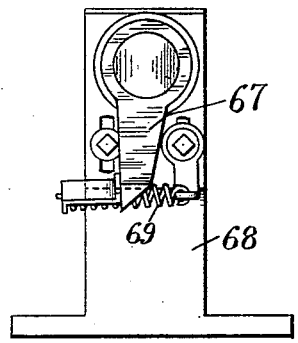
Fig. 12.
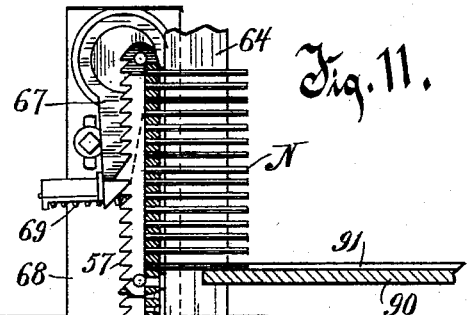
Fig. 11.
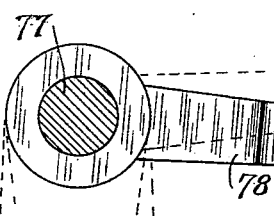
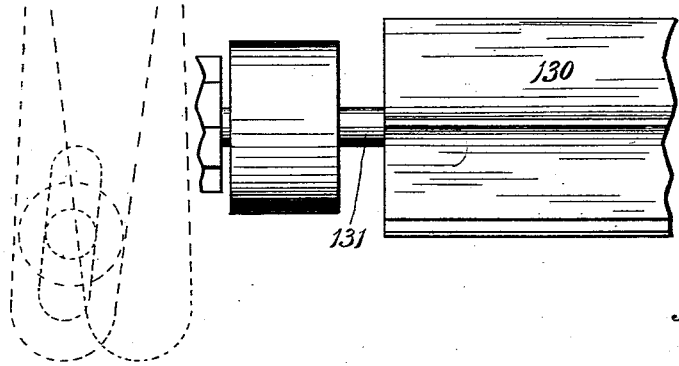
Fig. 29.
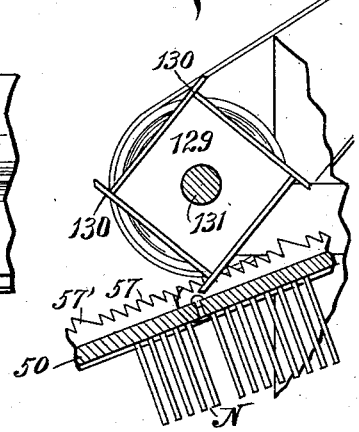
Fig. 28.
Witnesses. Inventor.
William H. Wyman
By Benedict & Morsell
Attorneys.

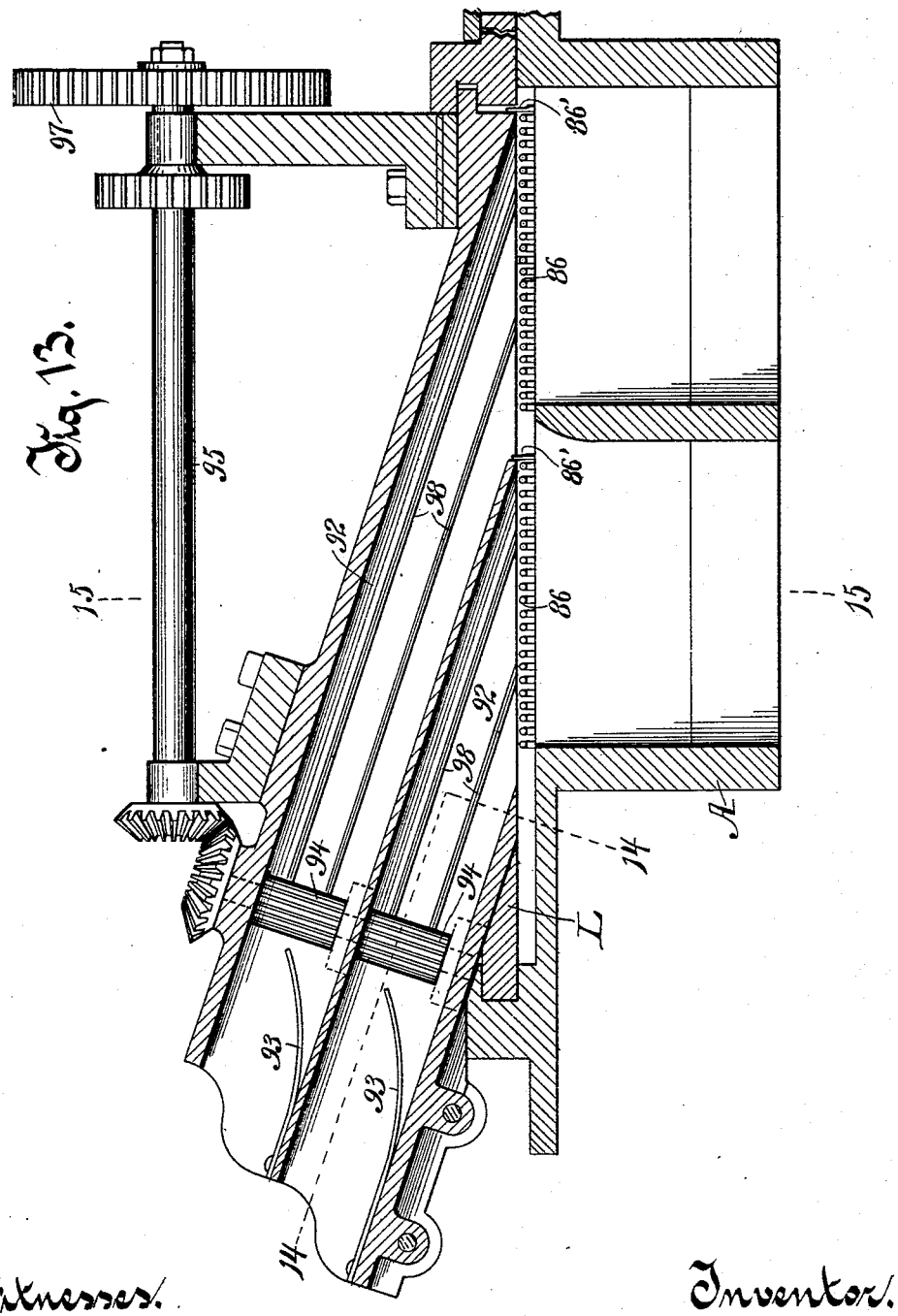

(No Model.)

20 Sheets—Sheet 12.

W. H. WYMAN.
MATCH MAKING MACHINE.

No. 570,529.  Patented Nov. 3, 1896.

Witnesses.  Inventor.

(No Model.)  W. H. WYMAN.  20 Sheets—Sheet 13.
MATCH MAKING MACHINE.
No. 570,529.  Patented Nov. 3, 1896.
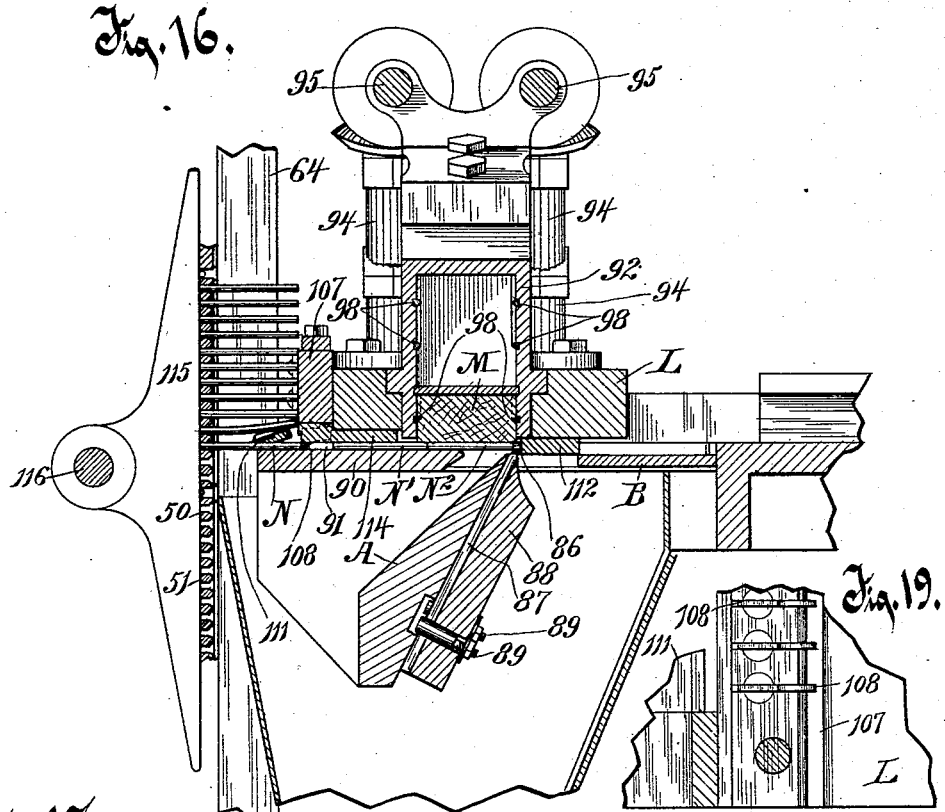
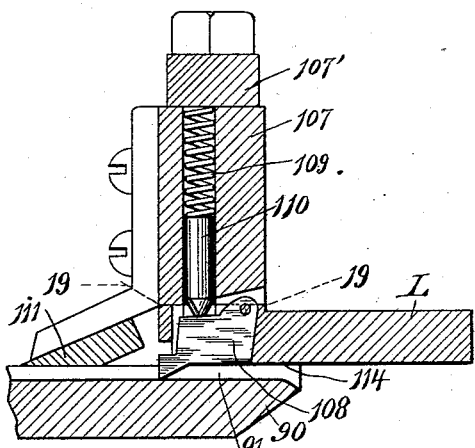
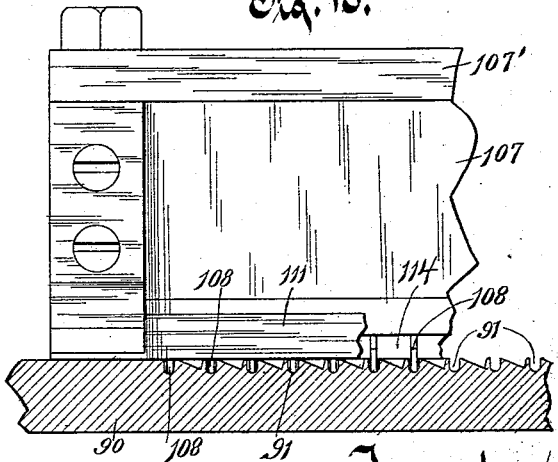

(No Model.) 20 Sheets—Sheet 14.
W. H. WYMAN.
MATCH MAKING MACHINE.
No. 570,529. Patented Nov. 3, 1896.
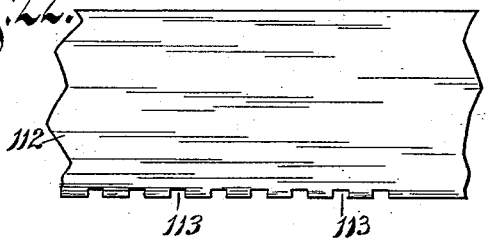
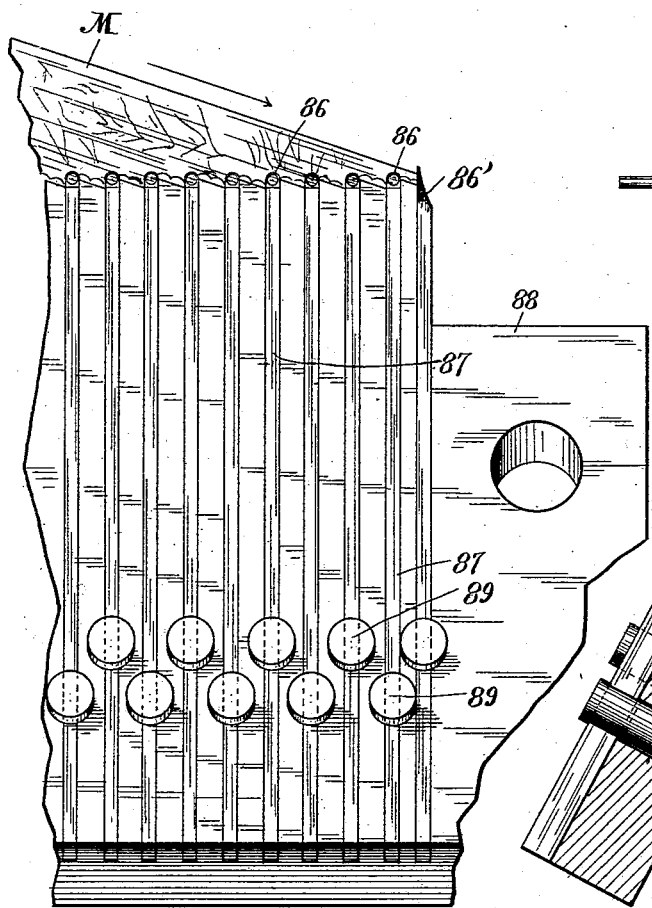
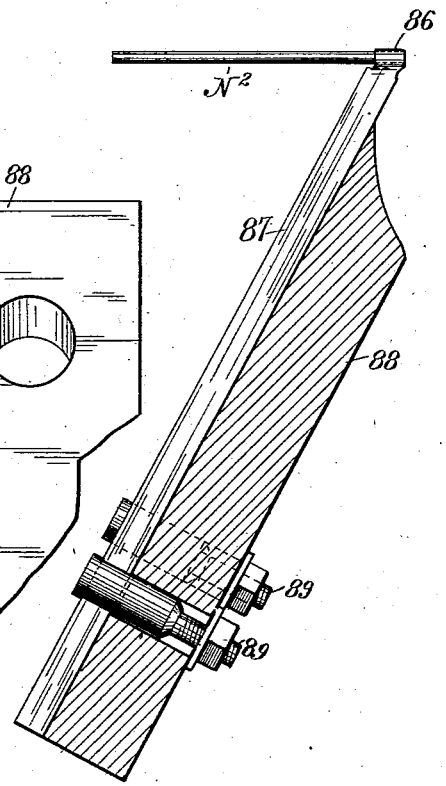

(No Model.)  
W. H. WYMAN.  
MATCH MAKING MACHINE.

No. 570,529.  
Patented Nov. 3, 1896.

Witnesses.

Inventor.
William H. Wyman
By Benedict Morsell
Attorneys.

(No Model.) 20 Sheets—Sheet 16.

W. H. WYMAN.
MATCH MAKING MACHINE.

No. 570,529. Patented Nov. 3, 1896.

Witnesses: Inventor:
William H. Wyman
By Benedict Morsell
Attorneys.

THE NORRIS PETERS CO., PHOTO-LITHO., WASHINGTON, D. C.

(No Model.)

20 Sheets—Sheet 17.

W. H. WYMAN.
MATCH MAKING MACHINE.

No. 570,529.  Patented Nov. 3, 1896.

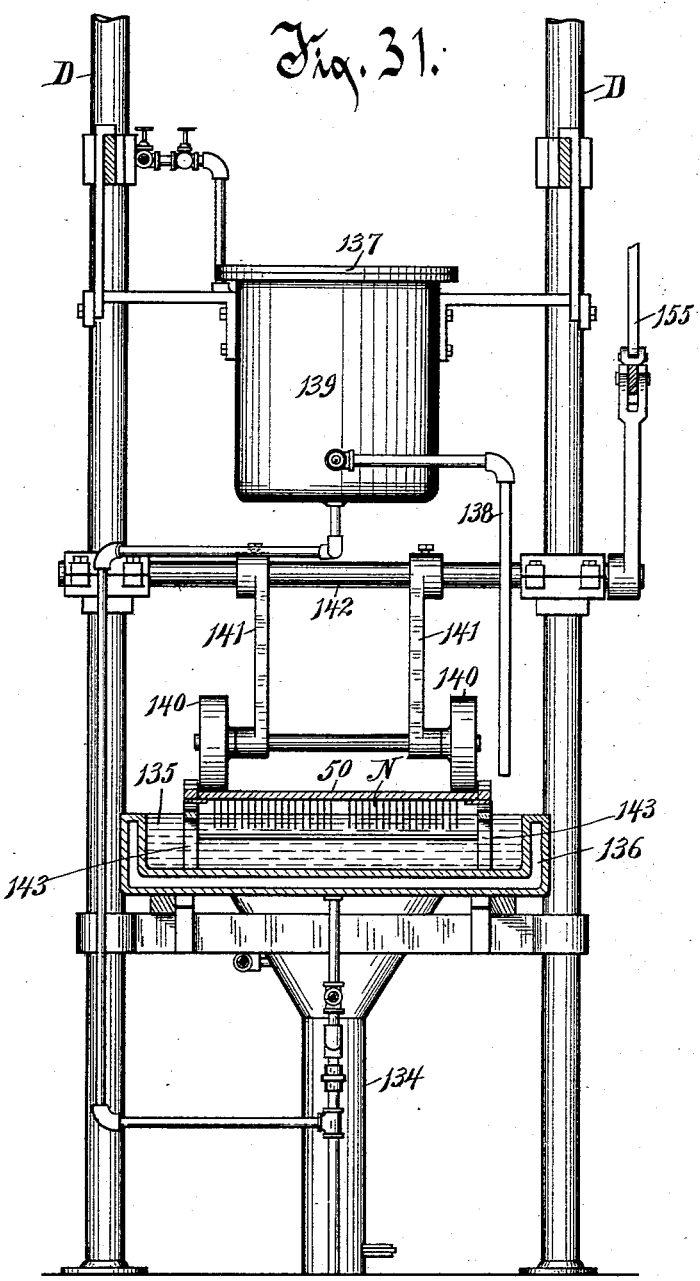

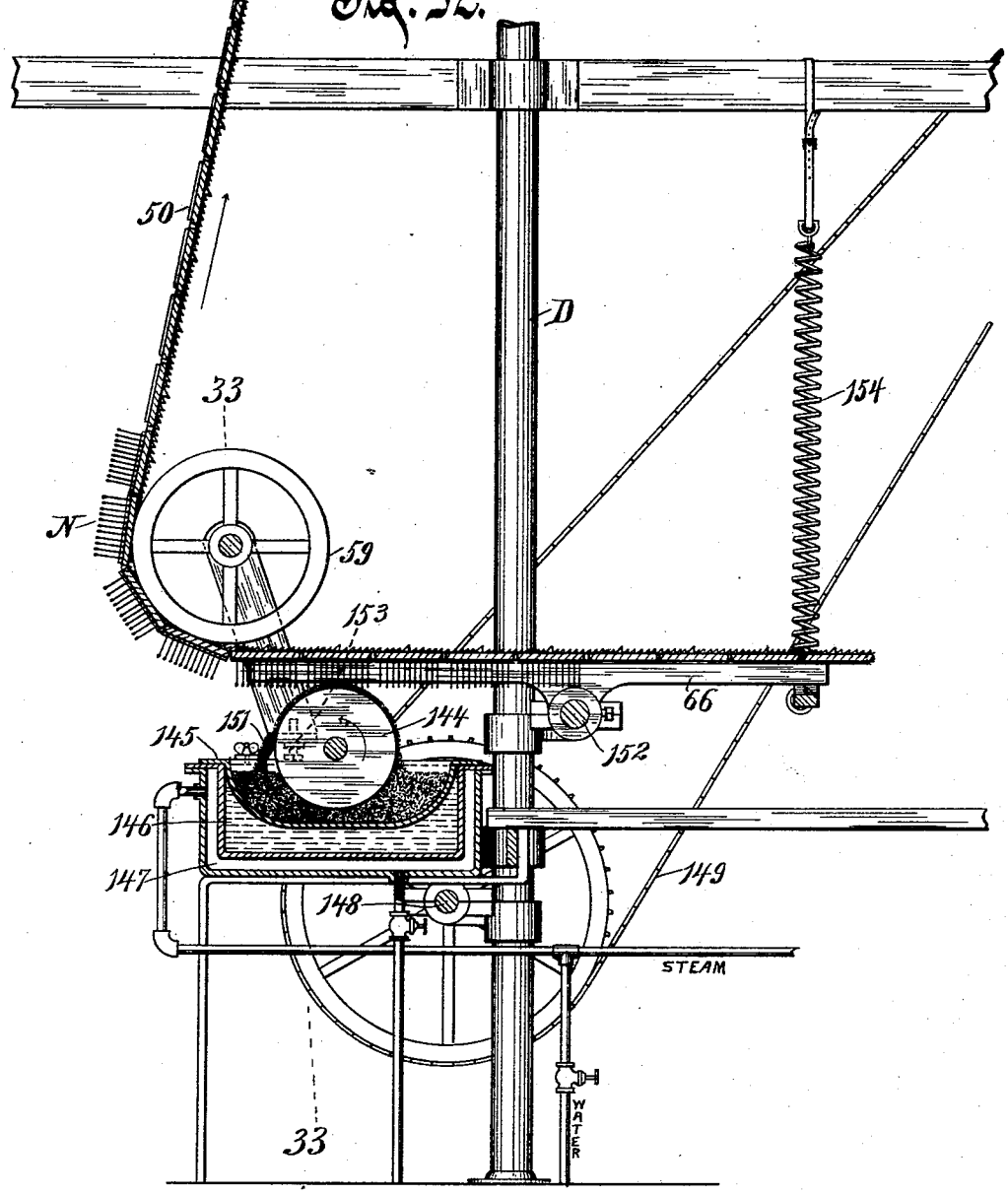

(No Model.)  20 Sheets—Sheet 20.

W. H. WYMAN.
MATCH MAKING MACHINE.

No. 570,529. Patented Nov. 3, 1896.

Witnesses. Inventor.
William H. Wyman
By Benedict & Morsell
Attorneys.

UNITED STATES PATENT OFFICE.

WILLIAM H. WYMAN, OF OSHKOSH, WISCONSIN, ASSIGNOR TO THE OSHKOSH MATCH WORKS, OF SAME PLACE.

MATCH-MAKING MACHINE.

SPECIFICATION forming part of Letters Patent No. 570,529, dated November 3, 1896.

Application filed May 2, 1894. Serial No. 509,864. (No model.)

*To all whom it may concern:*

Be it known that I, WILLIAM H. WYMAN, of Oshkosh, in the county of Winnebago and State of Wisconsin, have invented a new and useful Improvement in Match-Making Machines, of which the following is a description, reference being had to the accompanying drawings, which are a part of this specification.

My invention is a machine or organized apparatus for the manufacture of friction-matches.

The object of the invention is to provide mechanism that automatically performs all functions involved in cutting the sticks from a block of wood prepared for the purpose, carrying the sticks from the cutting devices to other devices by and through which the sticks are furnished with igniting composition, whereby the matches are completed, and for accomplishing other things incidental to the principal purpose of manufacturing matches.

The object, also, in such match-making machine is to provide simple, strong, enduring mechanism not liable to get out of repair and adapted for and capable of performing all the functions necessary in the most advantageous and skilful manner.

The invention consists in the mechanism and its parts, as hereinafter described and claimed, or their equivalents.

Figure 8:
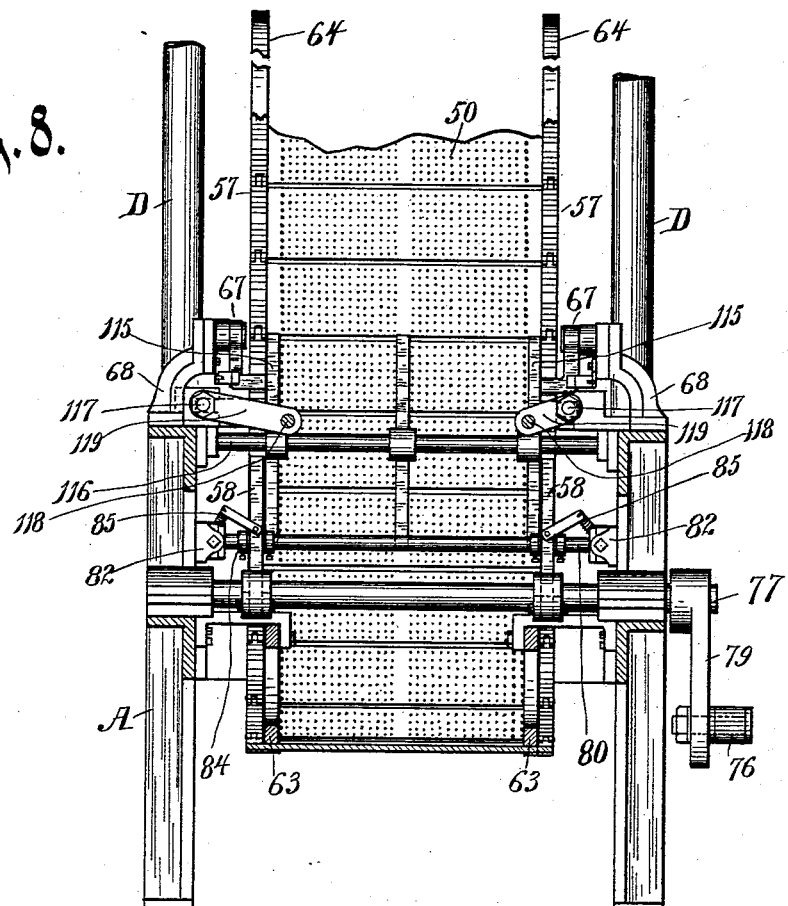
Figure 9:
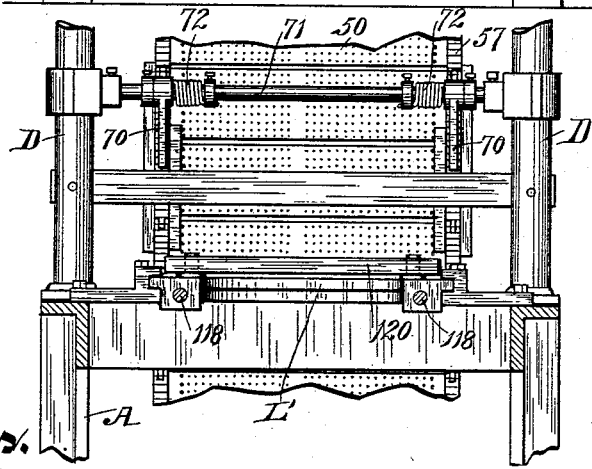
Figure 10:
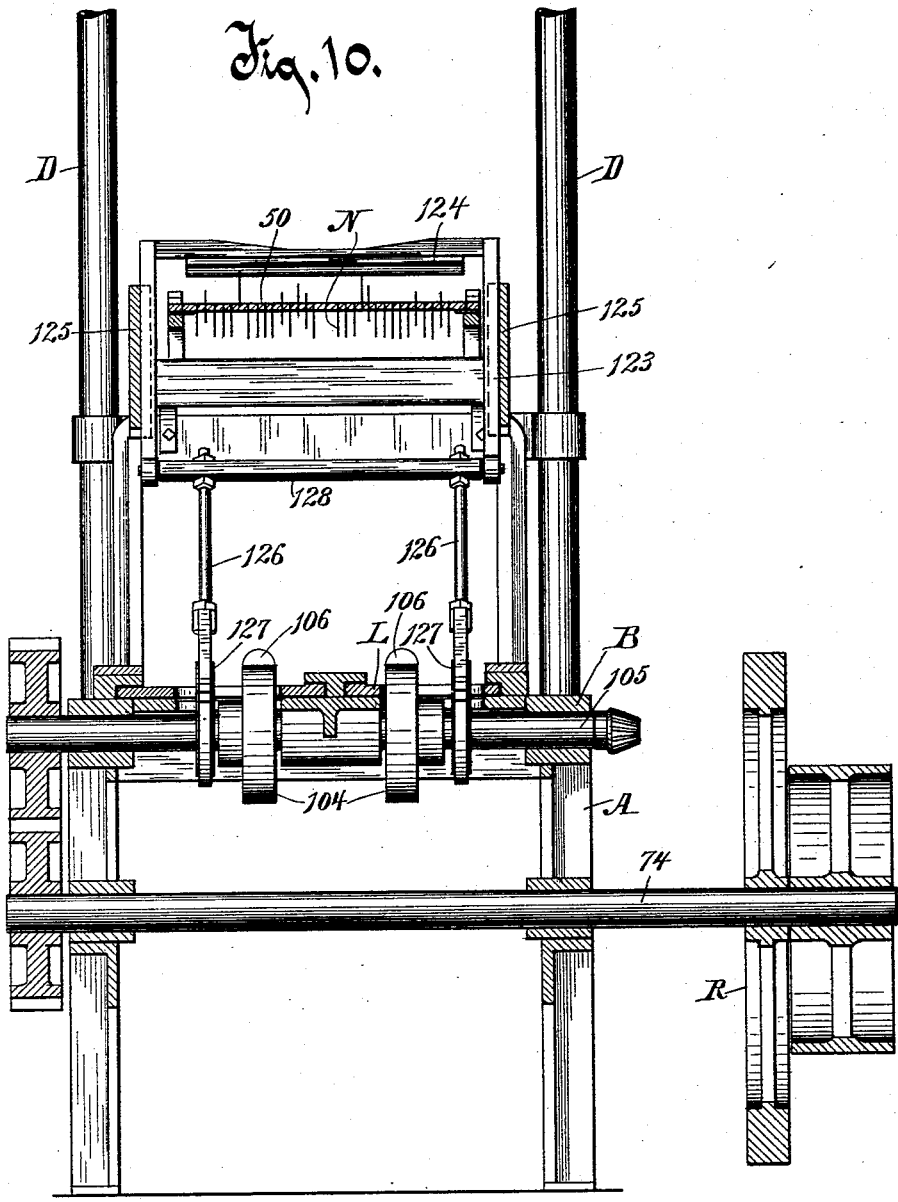
Figure 15:
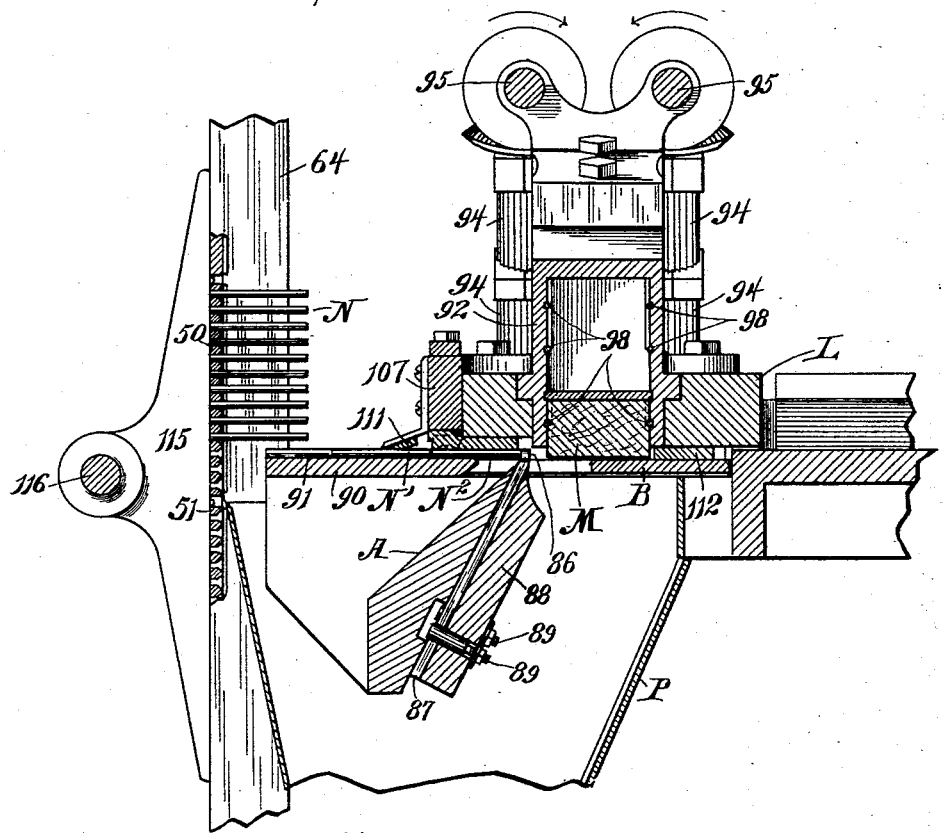
Figure 14:
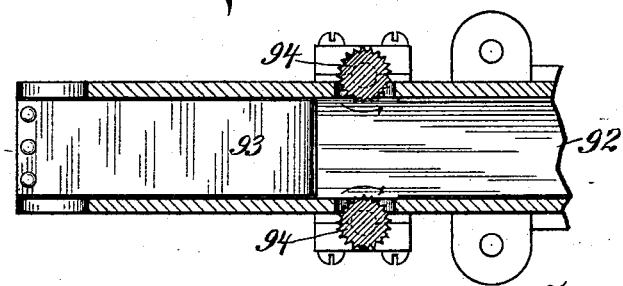
Figure 23:
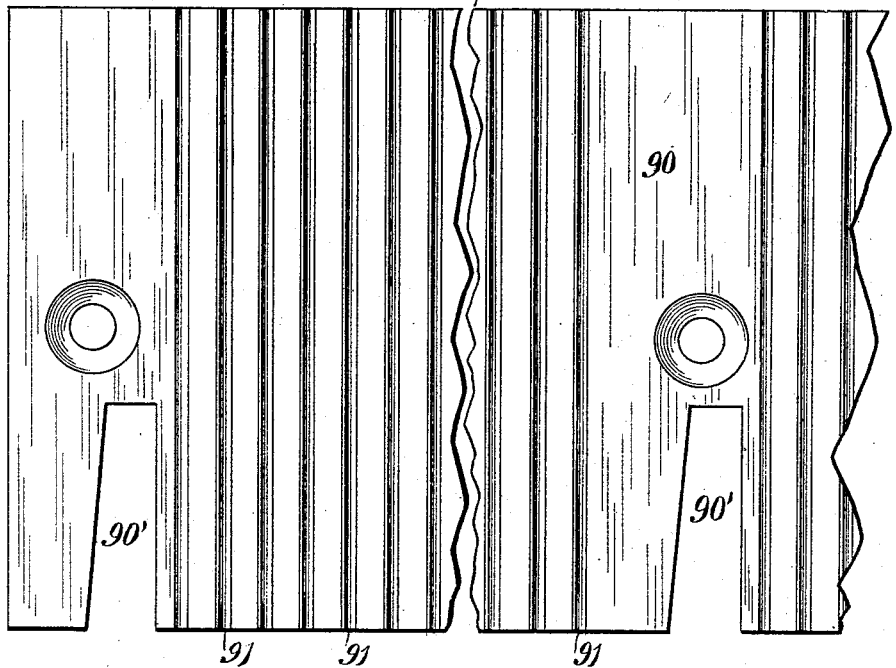
Figure 37:
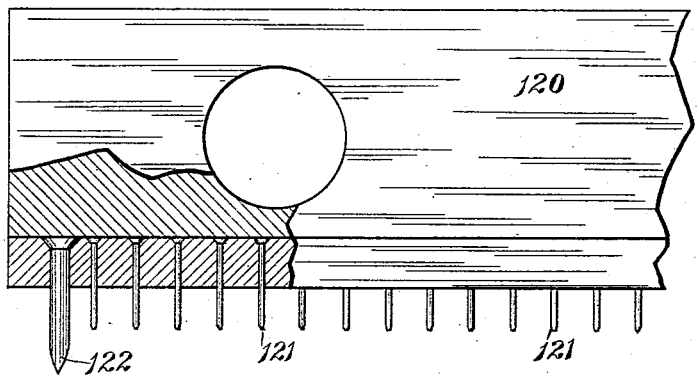
Figure 24:
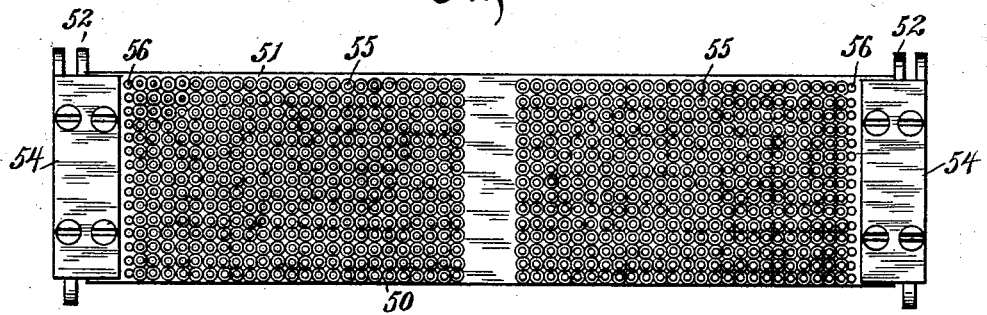
Figure 25:
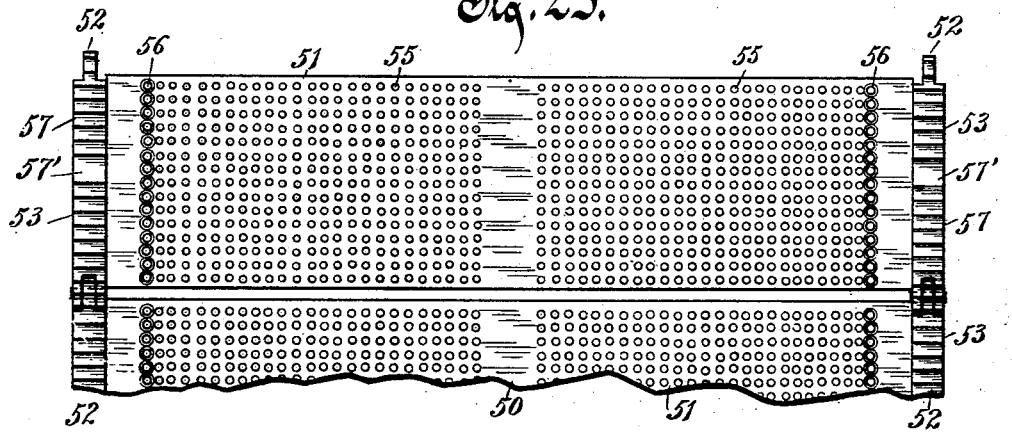
Figure 26:
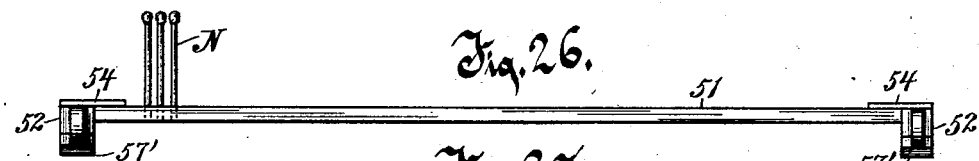
Figure 27:
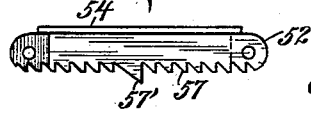
Figure 33:
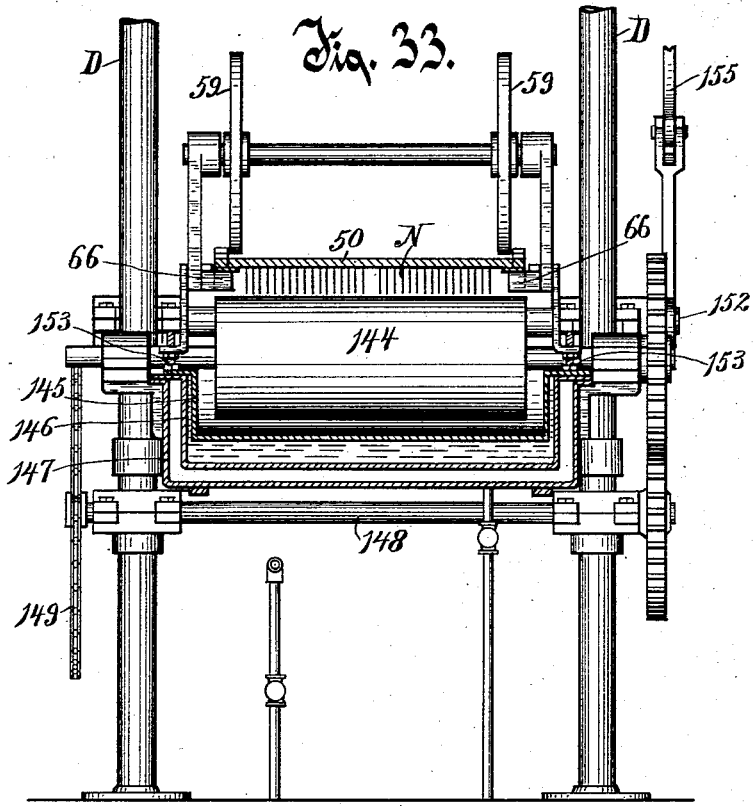
Figure 34:
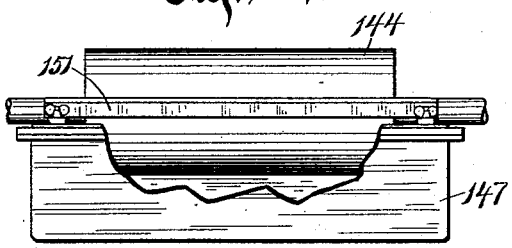
Figure 35:

In the drawings, Figure 1 is a side elevation, on a small scale, of the entire machine, (except the match-removing mechanism,) showing in a general way the principal parts thereof and their relation to each other. Figs. 2, 3, and 4 are side elevations, respectively, on a larger scale, of successive divisions of the machine. Fig. 5 is an elevation of the other side of a portion of the mechanism of that division of the machine seen in Fig. 2. Fig. 6 is a longitudinal vertical section, nearly central, of that portion of the machine shown in Fig. 5, looking toward the side at the front in Fig. 5. Fig. 7 is a plan of mechanism in that division of the machine shown in Fig. 5. Fig. 8 is a vertical section on line 8 8 of Fig. 6, looking toward the right. Fig. 9 is a portion of the mechanism at the left of line 8 8 of Fig. 6. Fig. 10 is a section on line 10 10 of Fig. 6, looking toward the right, showing, chiefly, a device for forcing back match-sticks that have been unduly pushed through the plates 51 by the sticking devices. Fig. 11 is a detail embodying mechanism for actuating the endless stick and match carrier. Fig. 12 is a detail of the click or dog (shown also in Fig. 11) for preventing the backward movement of the endless carrier. Fig. 13 is a vertical section of the block supporting and feeding mechanism, also showing the match-stick cutters. Fig. 14 is a detail in section of the feeding mechanism on line 14 14 of Fig. 13, looking downwardly. Fig. 15 is a transverse section of the feeding and cutting mechanism, taken on a line indicated by the line 15 15 on Fig. 13, and shows the block-holding mechanism and block in position for feeding to the cutters. Fig. 16 is a section showing the same mechanism as in Fig. 15, but in a position existing at the completion of the cutting of the stick. Fig. 17 is a detail in vertical section of stick-feeding mechanism. Fig. 18 is an elevation of a fragment of the mechanism seen in Fig. 17. Fig. 19 is a section on line 19 19 of Fig. 17, looking downwardly. Fig. 20 is a fragment of a cutter-plate with cutters in actual size secured thereto. Fig. 21 is a transverse section of the cutter-plate, showing a cutter thereon and the means of securing the cutter thereto. Fig. 22 is a fragment of the soft-metal thrust-receiving and cutter-clearing plate. Fig. 23 is a fragmentary plan of the bed or stick-supporting plate. Fig. 24 is a stick and match carrying plate, forming the principal part of a section of the endless-chain carrier. Fig. 25 shows the under or reverse side of the stick and match carrying plates and the method by which they are united into a flexible chain, and a toothed rack for engaging the means for driving the carrier and for preventing backlash thereof. Fig. 26 is an edge of the plate shown in Fig. 24. Fig. 27 is an end of the plate and serrated link shown in Fig. 26. Figs. 28 and 29 are a section and elevation, respectively, of a device for clearing off sticks or fragments thereof that still cling to the carrier at the rear after it has passed the device shown in Fig. 10. Fig. 30 is a vertical section of the paraffin tank and reservoir and the heating devices and related apparatus. Fig. 31 is an elevation and section on line 31 31, at a right angle thereto, of the apparatus shown in Fig. 30. Fig. 32 is a vertical section of the composition-tank and its roller therein, with related apparatus, and the stick and match carrier, with the means by which the carrier is made to travel near to or is thrown to a distance from the composition-carrying roller. Fig. 33 is a vertical section substantially on line 33 33 of Fig. 32. Fig. 34 is a detail of the composition tank and roller, showing scraper for clearing the roller. Fig. 35 is an end view of the rocking carrier-supporting ways seen in Fig. 32. Fig. 36, Sheet 5, is an elevation, at a right angle to their axles, of chain-carrying wheels seen in Fig. 4, showing the structure of the wheels and their arrangement with reference to the chain or carrier; and Fig. 37 is a fragment of the frame or rail, having guiding-pins and punching match-discharging pins adapted to enter the perforations in the carrier-plates at that side and as shown in Fig. 25.

For supporting the movable parts and operative mechanism a suitable frame A, having a top or table B, and standards C C' are provided; and also the pillars D are utilized, either directly or by means of brackets, rails, cross-bars, uprights, &c., secured thereto, for supporting other parts of the mechanism and apparatus.

A stick and match carrier 50 consists in a general way of a series of perforated plates 51, mounted on two endless chains 52 52, forming when so constructed a single jointed endless chain or belt traveling intermittingly on a plurality of wheels and on ways hereinafter described or designated. The carrier (moving downwardly at the right in Fig. 1) passes the match-discharging devices at E, the match-stick cutting and sticking devices at F, the device for clearing off rearwardly-protruding sticks at G, the heating device at H, the paraffin-tank at I, and the composition-roller at K. The particular disposition and arrangement of these several devices along the line of the carrier are not absolute, but are preferred.

The carrier 50 consists, specifically, of the plates 51, Figs. 24 and 27, and the chains 52, one link 53 of the chains being fixed to a plate at each end conveniently by means of a binding-plate 54. The links 53 are slightly longer than the width of a plate, and the links are pivoted together at their abutting extremities. The plates 51 are each provided with a large number of apertures 55, disposed in rows transversely of the carrier and at a suitable distance apart, which apertures are slightly smaller in area than the transverse area of the match-sticks to be stuck and by compression held and carried therein. The apertures 55 are also flared outwardly, Fig. 24, to more readily receive the match-sticks when being stuck therein. Other apertures 56 in the plates 51, one at each end of each transverse row of apertures 55, are adapted to receive therein guiding or alining pins hereinafter described, whereby the carrier is alined or registered with devices for inserting the sticks and with other devices for discharging the matches therefrom. These apertures 56 are flared on the rear or reverse side of the plate 51, as the pins enter them from that side. The links 53 are provided with ratchet-teeth 57 57', that in the carrier form continuous racks adapted to be engaged by the reciprocating actuated pawls 58, Figs. 6 and 11. The teeth 57 are of the same size and are at equal distances apart, except where the higher and wider teeth 57' are interposed. The teeth 57 are at the same distance apart as the rows of apertures 55, so that by the action of the pawls 58, at each reciprocation thereof, the carrier is moved ahead a distance equal to the distance between the rows of apertures 55, except that when the pawls pass over and engage the wider teeth 57' the carrier is moved forward a correspondingly-greater distance, which greater movements occur at the moments that spaces between adjacent plates 51 are opposite the points respectively at which sticks are received and matches are discharged. The carrier is supported and travels on the wheels 59, 60, 61, 61', and 62, and also on the downwardly-curved ways 63, the ways 64 extending upwardly and with a greater arc curving reversely to the ways 63, the downwardly-inclined ways 65, and the substantially horizontal and tiltable ways 66.

The structure and disposition of the wheels 60, 61', and 62 with reference to the carrier are shown in Fig. 36. The open structure and large size of the wheels 60 adapt them for the travel and safe carriage thereabout of the endless carrier and its load of matches on reverse or concave curves, thus providing for greater length of chain, and hence more exposure of the matches to the air for drying than could otherwise be obtained in so short a room. A convenience of utilizing the pillars D and uprights for supporting the wheels 60, 61, and 62 is that thereby, the brackets in which the wheels are journaled being clamped adjustably to the pillars and uprights, the wheels can be readily placed in position or relatively adjusted by adjusting the wheel-carrying brackets along the pillars or uprights. Clicks 67, Figs. 8, 11, and 12, pivoted to blocks adjustable vertically on posts 68, fixed on the frame, engage the teeth 57 57' of the racks on the endless chain and prevent backlash of the carrier. The clicks are held yieldingly up to their work by springs 69 and slip over the teeth as the carrier is pushed forward by the pawls 58. These clicks are located near (at the rear of) the point at which the carrier in its travel receives the match-sticks. Other clicks 70, revolubly loose on the fixed rod 71, Figs. 6 and 9, and held to their work between adjustable collars on the shaft by torsional springs 72, also engage the teeth 57 57' and prevent backlash or rearward movement of the carrier at the point of discharging the matches, whereby the chain is kept in proper alinement for the match-punching pins.

The endless stick and match carrier 50 is moved forwardly intermittingly by driving mechanism substantially as follows: The power-driven shaft 73 is belted to and drives the shaft 74, Figs. 1, 2, and 5, and an eccentric 75 thereon reciprocates a pitman 76, the pitman in turn actuating the rock-shaft 77, provided with cranks 78, Figs. 6, 8, and 11, to which the thereby reciprocated pawls 58 are connected, which pawls engage the teeth successively on the endless carrier and force it ahead intermittingly. The pitman 76 at one extremity rides on the eccentric 75 and at the other extremity is connected directly to a radially-adjustable wrist-pin in the crank 79, fixed on the rock-shaft 77. The pawls 58 are pivoted at one extremity to the cranks 78, fixed on the rock-shaft, and the movements of the pawls are so adjusted and controlled that they surely engage successively with the several small teeth 57, and with the higher and wider teeth 57' of the racks on the endless carrier. For this purpose the throw of the pawls, actuated by the rock-shaft, is slightly greater each time than the width of the teeth 57', so that these teeth when presented to the pawls are completely passed in the rearward movement and are caught in the forward movement thereof, and to prevent the pawls from catching any other than the first succeeding of the smaller and narrower teeth 57 the pawls ride medially on a transverse guide-rod 80, so adjusted as to carry the pawls obliquely toward and from the teeth and in such manner that they engage these teeth successively, but only during the latter part of their forward movement, forcing the carrier forward at each reciprocation a distance equal to the width of a tooth.

The rod 80 is at its extremities fixed in plates 81, which are adjustable on fixed brackets 82 toward and from the plane of motion of the carrier adjacent thereto. Antifriction-sleeves 83 on the rod 80 serve as bearings for the pawls and are held in place by collars 84 on both sides thereof on the rod. The pawls are held yieldingly up to their work by contractile springs 85.

The devices for cutting the match-sticks from a block of wood consist of a series of small knives or cutters 86, Figs. 15, 16, 20, and 21, preferably annular in form, constructed severally on the end and advisably obliquely transversely of its stem 87. These cutters are severally secured detachably to a grooved cutter-bar 88 by a bolt 89, having a slot through which the cutter-stem is inserted and a nut turning thereon and clamping the stem to the bar in a groove thereof, into which it fits. The cutter-bar and the cutter-stems therein rest against a suitably-formed portion of the frame A, and the cutters are secured rigidly in place on the frame by the cutter-bar 88 being bolted thereto. The cutters project upwardly through an opening therefor in the table or bed B, Figs. 13, 15, and 16, the opening being of sufficient extent in front and at the rear of the cutters to provide for the escape or clearance downwardly therefrom of the refuse splints or material removed from the block of wood. The inclination of the cutter-stems downwardly provides a substantially vertical passage for refuse at the front and rear of the cutters, where such refuse is produced, and through which it falls directly into the discharging-chute.

Vertical knives 86', Figs. 13 and 20, secured to the frame in the same manner as cutters 86 are fastened thereto, are so placed as to be adapted, by the reciprocation of the carriage past them, to cut off the useless wedge-shaped edges of the wood-blocks, which edges or splints so cut off drop through the table, the apertures 90' alongside the knives being provided in plate 90 therefor. To the front of the cutters there is a plate 90, Figs. 15, 16, and 23, forming a part of the table or bed, which has parallel grooves 91, corresponding to and registering with the cutters in the rear and with a row of apertures 55 in the plates of the endless carrier at the front thereof. These grooves are of suitable size to and do serve as troughs or ways for conducting the match-sticks from the cutters to the carrier, into which they are stuck.

A primary block or material holding and feeding mechanism is mounted on the reciprocating carriage L and is substantially as follows: Troughs or boxes 92, (of which there may be one or more, two being shown and advised in a machine of convenient and ordinarily ample size, Figs. 2, 6, 13, 15, and 16,) which boxes are arranged one above the other and are disposed obliquely to the plane of the horizontal row of cutters 86, springs 93 to hold the blocks suitably against the upper, longer, and opposite walls of the boxes, corrugated feed-rollers 94 to feed the blocks forward, reversely-rotating shafts 95, geared to each other and respectively to the corrugated rollers, and a pawl 96, pivoted on the permanent frame, which pawl engages in one direction the teeth of a wheel 97 on one of the shafts 95, and as the carriage L reciprocates compels the intermitting rotation of the corrugated feed-rollers. Ribs 98, fixed in the walls of the boxes 92 longitudinally thereof, enter the blocks of wood slightly and serve as guides to keep the blocks in proper position against the longer oblique sides of the boxes while being fed to place in front of the cutters. The blocks are thus held against and advanced to the cutters alongside of and backed by the upper longer oblique walls of the boxes, so that the push of the cutters cannot lift them from position. The pawl 96 is advisably made in two parts joined together by a reversely-screw-threaded nut or turnbuckle 99, by which its length can be adjusted. The throw of the carriage L, carrying toothed wheel 97, is greater than the width of the wheel-teeth, and a guide is therefore required for the pawl, and as it is sometimes desirable to stop the feed, while otherwise the machine continues in operation, a device is provided for this purpose, which consists of the rock-shaft 100, Fig. 7, provided with a cam 101, on which the pawl rides, which is adapted normally to guide the pawl into engagement with the teeth of the wheel 97, and by the rocking of the shaft to lift it out of engagement with the wheel. The rock-shaft is mounted on the frame A, and is provided with a crank-handle 102, having a spring-latch taking into the segmental rack 103. The parts are so disposed and adjusted with reference to each other that the blocks M (one only being represented) are fed forward near the close of the rearward movement of the carriage, the position being substantially that shown in Fig. 15.

The blocks of material having been fed to position in front of the cutters by the mechanism just described are thereafter and intermittingly fed to the cutters by the horizontal reciprocation of the carriage L, on which the aforesaid primary feeding mechanism is mounted. The carriage L is suitably mounted reciprocably on the frame A, and is reciprocated by eccentrics 104, fixed on a counter-shaft 105, geared to the driving-shaft 74, Figs. 6 and 7. These eccentrics bear at the front and rear respectively against blocks 106, secured, adjustable toward the front and rear, to the carriage. By adjustment of the blocks 106 the position of the carriage and its throw with reference to the cutters and the endless carrier are regulated, and any wear of the parts can be taken up. At the front end of the carriage L there is a transverse head-piece 107, in recesses in the lower edge of which the dogs 108 are pivoted, each of which dogs is directly above, so as to register with and drop into a groove 91 of the plate 90, Figs. 6 and 15 to 19. The front extremities of these dogs drop by gravity into the grooves 91, but they are held more securely to their work by springs 109 in the head-piece that push against movable blocks 110 resting on the dogs. The dogs are adapted to drop behind the match-sticks and by the forward movement of the carriage to push them to and thrust them into the apertures therefor in the plates 55 of the carrier. The springs 109 and the blocks 110 are removable from the head-piece by detaching the bolt-secured spring-retaining cap 107' therefrom. In front of the head-piece 107 and secured thereto there is a forwardly-projecting transverse nose-piece 111, which rests movably on the upper surface of the plate 90, and is adapted to hold down the sticks of the row in front of the head-piece (being stuck into the carrier) and prevent them from jumping out of the grooves vertically. The head-piece 107 in its forward movement will also strike against the ends of sticks that are incompletely inserted in the carrier and will push them into it, so that all the sticks will project from the carrier the same distance. At the rear of the wood blocks there is a clearing-plate 112, Figs. 15, 16, and 22, of soft metal, preferably of copper, secured to the under side of the carriage directly in front of the cutters, having recesses 113 in its edge, into which the cutters are received as the cut of the match-sticks is finished, and against the rear walls of which recesses the edges of the cutters impinge, whereby the cutters are cleared of wood splints and refuse without injury to the cutters. It will be understood that in operation the carriage L being at the limit of its travel rearwardly, and the wood blocks having been fed into position before the fixed cutters, Fig. 15, the movement of the carriage toward the front carries the blocks to and forces them past the cutters, Fig. 16, whereby a series of match-sticks $N^2$ are cut from the blocks, the sticks being held in the cutters at their rear ends until forced out by the cut of sticks at the succeeding forward movement of the blocks.

As the sticks $N^2$ are cut from the blocks and push through the cutters they impinge against and force the preceding series of sticks N' forward in the grooves 91 of the plate 90, to which the sticks are held loosely by the plate 114, Fig. 16, secured to the carriage above them. When the carriage has moved rearwardly to the limit of its travel, the dogs 108, actuated by springs 109, enter the grooves 91 at the rear of the match-sticks N' and with the forward movement of the carriage push them forward and stick them in series N into the row of apertures 51 in the endless carrier then in position to receive them. The match-sticks being slightly larger in size than the apertures are held in the plates in the manner common in inserting pegs in holes and for long time in use in securing match-sticks in plates for dipping. By the same movement of the carriage the preceding series of match-sticks N in the carrier are lined up by the nose 111. Opposite the front end of the carriage at the reverse side of the carrier at this point there are thrust-blocks 115, vertically longer than single plates of the carrier, Figs. 6, 7, 8, 15, and 16, secured to the frame opposite unperforated lines of the plates, adapted to hold the carrier in place against the thrust of sticking the match-sticks into it. These thrust-blocks are conveniently supported on a transverse rod 116, fixed in the frame.

For discharging the finished matches from the carrier an auxiliary carriage L' is secured to and in front of the carriage L, which auxiliary carriage is practically a part of the carriage L and reciprocates therewith horizontally in ways therefor in the frame A, Figs. 6, 7, 9, and 37. This auxiliary carriage L' is secured to carriage L adjustably with reference thereto by the rods 117, fixed in carriage L, and the rods 118, fixed in the auxiliary carriage L', said rods being secured together by the tie-bars 119, in which the rods are inserted and held by nuts and set-screws. A transverse head-rail 120, Figs. 6, 7, and 37, secured to the auxiliary carriage L', is provided with forwardly-projecting pins 121, adapted to enter a row of the apertures 55 in the plates 51 of the carrier and push the matches therefrom. Also there are longer pointed pins 122 projecting forwardly from the rail 120, adapted to enter the flared apertures 56 in the plates 51 and compel the exact registration of the pins 121 with the apertures 55 in the plates, so that the pins 121 will surely enter the apertures and discharge the matches therefrom. The same forward movement of the carriage that thrusts a row of sticks into the carrier at F, Fig. 1, discharges a row of matches from the carrier at E after the sticks and matches have traveled with the carrier very nearly its entire route.

Occasionally match-sticks, when being stuck into the carrier, are pushed partially through the plates 50 and project therefrom on the reverse side of the carrier. To force such sticks back to proper place in the carrier, a reciprocating frame 123, Figs. 6 and 10, having a cross-bar 124 so disposed and connected as to move toward the carrier opposite each row of apertures 55, is mounted in suitable fixed ways 125 and is actuated by pitmen 126, connected at one extremity to the frame and at the other extremity riding on eccentrics 127 on the counter-shaft 105. The pitmen 126 are attached adjustably to a transverse rod 128, pivoted axially in the frame 123. A little farther along on the route of the carrier a revoluble head 129, Figs. 2, 28, and 29, fixed on the shaft 131, is provided with match-breaking plates 130, so disposed transversely of the carrier as, when the head revolves, to cut or break off and clear away from the carrier any remaining rearwardly projecting or clinging match-sticks. The shaft 131 is belted to and driven by the independently-driven shaft 132.

A heating drum or box 133, Figs. 1, 3, and 30, is located beneath the carrier along that part of its route just preceding the paraffin-tank, and being supplied with steam or hot air is adapted to warm the matches, thereby suitably preparing them for taking paraffin. A chute 134, below and leading away from the carrier and through which a draft of air is constantly sucked downwardly, is located immediately in front of the paraffin-tank and is adapted to carry away any loose match-sticks or foreign matter, thus further preparing the match-sticks for being dipped in the paraffin and receiving the igniting composition.

A tank 135, located near to and below the carrier, is supplied with melted paraffin, and the projecting match-sticks, for about one-third their length, are passed through and coated with the paraffin as they pass the tank. The tank is set in a steam-tight chamber 136, and by steam therein the paraffin is kept in fluid state. The tank is supplied with melted paraffin from the reservoir 137 above it through pipe 138, of suitable size and so regulated as just to supply the constant loss of paraffin in the tank, the reservoir being also set in a steam-chamber 139 for reducing the paraffin to and keeping it in a melted condition. The carrier is depressed and held down suitably to the tank 135 by depressing-rollers 140, Figs. 3, 30, and 31, traveling thereon, which rollers are mounted in crank-arms 141, fixed on the rock-shaft 142. The crank-arms are so disposed that they swing and lift the rollers away from the carrier in an arc in the forward direction of the movement of the carrier. Guards 143, set in the tank 135 continuous above the tank, serve as ways against which the carrier may bear, and thereby be prevented from being depressed unduly into the tank under strain of the rollers or otherwise.

For applying the igniting composition to the ends of the match-sticks a drum or roller 144, Figs. 3, 32, 33, and 34, journaled in brackets attached to the hot-water box 146, is located below and transversely of the carrier and is so disposed as to revolve in and take up composition held in the pan 145. The pan 145 is set removably in the hot-water box 146, which in turn is set in the tight steam-chamber 147. The roller 144 is geared to the shaft 148, the shaft being driven by a sprocket-chain 149, running also on shaft 150, which in turn is belted to the driven shaft 132. The composition in the pan 145, which is to be applied to the ends of the match-sticks, is when duly heated of such semifluid consistency and of such viscid quality as to stick to and form a coating on the roller 144 and is thereby carried upwardly and over on and with the roller, revolving slowly in the direction of the movement of the carrier, the carrier at this point traveling at the same speed with the roller 144 on the horizontal but tiltable ways 66 and on the thereon-mounted wheels 59, so disposed as normally to carry the match-sticks past the top of the roller 144, so near thereto that their ends enter and are covered by the composition on the roller, thus forming the igniting-heads of the matches. A scraper 151, Figs. 32 and 34, secured detachably to the pan 145, is so disposed as to clear the roller 144 of the composition remaining thereon after passing the match-sticks.

It is desirable sometimes when the machine is in operation and always when the machine is stopped to raise the carrier away from the composition-roller 144 and from the paraffin-tank 135, and for this purpose tiltable ways 66 and wheels 59, mounted thereon, are provided, on which ways and about which wheels, turning inwardly at a substantially right angle in its route, the carrier travels. The ways 66 are fixed on the supporting rock-shaft 152 and are normally held yieldingly in a substantially horizontal position and suitably near to the composition-roller and against the strain of the carrier about the wheels 59 by the contractile spring 154. Adjustable bearings 153 on the ways 66 rest on the flange of the pan 145 and prevent the ways from approaching too near to the roller 144. To raise the carrier away from the composition-roller and from the paraffin-tank, the ways 66 are tilted away from the roller in the direction of a hypotenuse to the normal line of the carrier, carrying the wheels 59 therewith inwardly from the peripheral route of the carrier, and the depressing-rollers 140 are lifted off from the carrier, thus releasing the carrier limitedly and permitting it to be raised by means hereinafter described. No excess in length of the carrier is required by this construction for lifting the carrier from the composition-roller and the paraffin-tank. For conveniently tilting the ways 66 and lifting the rollers 140 a jointed rod 155, Figs. 2 and 3, to one part of which cranks on shafts 142 and 152 are respectively pivoted, is at its other extremity connected to a crank on rock-shaft 156, and the rock-shaft is provided with a crank-handle 157, preferably counterpoised, by means of which the shaft is rocked and the rollers 140 are readily lifted and the ways 66 with that portion of the carrier thereon are tilted up. The crank or lever handle 157 is provided with a spring-actuated latch 158, that takes into the segmental rack 159 to lock the handle releasably in position. When the wheels 140 are forced down and the carrier is depressed into the paraffin-tank and the tilting ways 66 are thrown down to the composition-roller, they are held unyieldingly in these positions by the locking of the lever-handle 157 to the fixed rack 159. The wheels 61' are mounted in blocks that are loose on pillars D and are free to move vertically thereon, and the weight of these wheels, their mountings, and adjacent portions of the carrier is such that as soon as the ways 66 are tilted and the rollers 140 are lifted the wheels 61' settle down on and with the carrier, automatically taking up the slack therein and lifting the carrier away from the roller 144 and from the paraffin-tank 135.

When the machine is in use, the wheels 61' are prevented from moving upwardly by collars above them on the pillars D. These collars are moved from the positions shown in Figs. 1 and 4 down and are clamped firmly to the pillars close above the blocks in which the wheels are mounted, so that the carrier is held taut throughout its length and is not permitted by strain thereon to lift the wheels 61' and rise at this point when in operation. In fact these collars can be permanently clamped to the pillars, so as not to permit the chain to rise at this point, though free to go down.

An upwardly-opening and downwardly-discharging chute P, Fig. 6, immediately below the stick cutting and feeding devices, is adapted by means of a downward-suction air-blast therethrough to withdraw splints and foreign matter from the vicinity of the cutters. A gate P' is provided in the chute for regulating the draft or closing the chute when desired. A fly-wheel R, fixed on the driving-shaft 74, steadies the motion of the mechanism operatively connected to the shaft.

As the matches are discharged from the carrier at E, Fig. 1, they fall on an endless apron 160, Figs. 2, 5, 6, and 7, by which they are conveyed to the laterally-traveling endless straightening-apron 161, from which they are taken by an operator to be put in boxes. The apron 160 travels on the two rollers 162 162', journaled in the frame in substantially the same horizontal plane, and on the roller 163, journaled in blocks movable vertically in the frame and adjustable by screws 164, turning in the frame. By this construction the tension of the apron can be regulated as desired. The roller 162, which drives the apron, is belted to counter-shaft 165, which is geared to the shaft 166, said shaft being also geared to the counter-shaft 105.

The apron 161, which is slightly wider than the matches are long, travels at a right angle to and past the apron 160, near its discharging-line, so that the matches being conveyed endwise on apron 160 from the carrier 50 to the apron 161, and in such position mostly being deposited on the apron 161, are carried laterally by it to the gate or stop 167, against which they bank up, lying straight across the apron in convenient position to be readily removed by the operator for boxing. The apron 161 runs and is driven at one end on a roller fixed on the shaft 166 and at the other end on an idle-roller mounted on a fixed support. The gate 167 is pivoted in and between boards 168 168' at the sides of the apron, and which with the apron form a trough for the matches. The gate is disposed at an inclination to the upper surface of the apron and is held yieldingly thereto by a spring 169, acting on a crank secured to the pivot on which the gate is fixed. The side board 168 extends nearly the entire length of the apron 161 at its outer edge, rising most of the distance only a little above its upper surface, said board being also the rear wall of a box 170, which box serves to contain a large box for the storing of matches prior to transferring said matches to the smaller match-boxes.

Steam or hot water or both are supplied to the drum 133 and to the chambers 139, 136, and 147, respectively, and the water of condensation or waste is discharged therefrom by the system of piping shown and designated on the drawings.

What I claim as my invention, and desire to secure by Letters Patent, is—

1. The combination with a flexible endless match-carrier consisting of a series of plates hinged together, which carrier has a ratchet-toothed rack thereon coextensive with its length in which a portion of the teeth at regular intervals are higher and wider than the other teeth, of a reciprocating pawl having a regular constant throw as great as or greater than the width of the larger teeth, the pawl being disposed at an oblique angle to the plane of motion of the carrier and so guided as at each reciprocation to engage successively all the teeth of the rack both large and small, and advance the carrier intermittingly variantly, substantially as described.

2. In a machine for manufacturing matches, the combination with an endless carrier having means at varying distances apart for receiving and holding match-sticks and provided with a ratchet-toothed rack coextensive with its length which rack includes both large and small teeth, of a device for advancing the carrier intermittingly and variantly comprising an actuated rock-shaft, a crank thereon, a pawl pivoted to the crank at an oblique angle to the carrier, and adapted at each reciprocation to engage successively the several teeth of the rack, the throw of the pawl being sufficient to retrieve it past the large teeth, an adjustable guide on which the pawl rides medially, and means for holding the pawl to its work, substantially as described.

3. In a machine for manufacturing matches, the combination with an endless carrier having means at varying distances apart for receiving and holding match-sticks and provided with a ratchet-toothed rack coextensive with its length which rack includes both large and small teeth, of a device for advancing the carrier intermittingly and variantly, comprising an actuated rock-shaft, a crank thereon, a pawl pivoted to the crank at an oblique angle to the carrier and adapted at each reciprocation to engage successively the several teeth of the rack, the throw of the pawl being sufficient to retrieve it past the large teeth, and an adjustable guide on which the pawl rides medially, and spring-actuated clicks 67 located near to and just ahead of the pawls, adapted to pass and engage the rack-teeth of varying widths with equal certainty and prevent backlash when the pawls are being retrieved, substantially as described.

4. In a match-machine, the combination with an endless match-carrier so mounted as to have plates thereof disposed parallel with each other at two opposite points of its travel, and a series of fixed stick-cutters in front of one line of said plates, of a reciprocating carriage opposite said plates in the carrier at the points aforesaid, and adapted by its forward motion to force a wood block against the cutters and thrust the sticks cut therefrom into one of the plates and to eject matches from another plate at the other of the two points aforesaid, substantially as described.

5. In a match-machine, the combination with a permanent frame, of a cutter-bar secured rigidly thereto, said cutter-bar being provided with a series of transverse grooves disposed at an oblique angle to carriage-ways on the frame, and a plurality of tubular match-stick cutters each provided with a stem or stock at an oblique angle to the axis of the cutter, the stock being adapted to fit in one of said grooves of the cutter-bar, and means substantially as described for securing the stocks severally rigidly but detachably in the cutter-bar, as set forth.

6. In a match-machine, the combination with a frame, a series of cutters fixed therein, and grooves or ways for match-sticks leading rearwardly therefrom, of a reciprocable carriage and dogs pivoted on the carriage in the rear of the cutters adapted to drop behind the match-sticks and by the movement of the carriage to push them forward toward and into a carrier, substantially as described.

7. In a match-machine, the combination with a frame, a series of cutters fixed therein and a material-carrying carriage reciprocable over the cutters, of dogs pivoted to the carriage adapted to drop behind the match-sticks and by the movement of the carriage to push them forward, and springs arranged to hold the dogs yieldingly to their work, substantially as described.

8. In a match-machine, the combination, with a reciprocable carriage adapted to insert rows of match-sticks in an intermittingly-moving carrier, of a nose-piece secured to the head of the carriage, adapted to hold down rows of match-sticks in front of the head, being pushed into the carrier, substantially as described.

9. In a match-machine, the combination with a relatively slow moving stick-carrier, of a revoluble head, and knives mounted thereon transversely of and near to the carrier, the knives by their rapid revolution being adapted to cut off and clear the carrier of match-sticks or fragments of them, at the rear thereof, substantially as described.

10. In a match-machine, the combination with a flexible match-stick carrier, and a tank for holding melted paraffin located below, but near to the carrier, of a device for depressing the carrier into the tank, comprising rollers mounted in swinging arms fixed in a rock-shaft, and means for oscillating the rock-shaft whereby the rollers can be thrown against and made to depress the carrier and hold it steadily down, or the rollers can be raised from the carrier permitting the raising of the carrier, substantially as described.

11. In a match-machine, the combination with permanent supports, of a tank or chamber 147 fixed thereon, a hot-water box 146 set removably in the fixed tank so as to form a steam or hot-water chamber between them, a composition-pan 145 set removably in the hot-water box, and a composition-roller journaled in the brackets fixed on the hot-water box and so disposed as to dip into and rotate in the contents of the pan, the pan and the hot-water box with the roller mounted thereon being severally removable from the steam-tank and from each other, substantially as described.

12. In a match-machine, the combination with ways pivoted on a permanent support and wheels mounted on the tilting ways at a distance from the axis thereof, of an endless flexible and normally taut traveling match-carrier, the parts being so disposed that the carrier runs on its ways and turns at substantially a right angle on and about the wheels mounted on the ways and so that by the tilting of the ways the wheels are carried inwardly from the angle of the turn of the carrier about the wheels whereby slack is provided in the carrier permitting of the lifting or deflecting of the carrier from its course, substantially as described.

13. In a match-machine, the combination with an endless flexible carrier, of tilting ways, wheels mounted on one arm of the tilting ways about which the carrier runs turning substantially at a right angle about the wheels, the wheels and ways being so disposed as to tilt inwardly from the angle, other wheels adjacent thereto over which the carrier runs, and gravity-acting wheels movable vertically riding on the carrier adapted to lift the carrier from the angle aforesaid when the ways are uptilted, substantially as described.

14. In a match-machine, a rock-shaft, tilting carrier-ways fixed on the shaft, another rock-shaft, carrier-depressing rollers mounted in crank-arms fixed on the last-mentioned rock-shaft, other crank-arms on both said rock-shafts, a third rock-shaft having a crank-arm, a rod connecting the crank-arms on said three shafts, and a crank-handle fixed on the third rock-shaft, adapted to simultaneously tilt the carrier-ways and swing the depressing-rollers, combined substantially as described.

15. In a match-machine, the combination with an endless carrier, and a composition-roller, of tilting ways on which the carrier runs near to the composition-roller, wheels mounted on an arm of the tilting ways about which wheels the carrier runs at an angle the strain of the carrier on the wheels tending to tilt the ways upwardly, and a spring adapted to hold the ways to position against said strain of the carrier, substantially as described.

16. In a match-machine, the combination with a frame, a carriage reciprocative on the frame, and means in the carriage for holding a wood block and presenting it to cutters in the frame at an oblique angle to the plane of the cutters, of said cutters fixed in a plane in the frame, and a knife fixed in the frame at the end of the series of cutters, said knife being adapted to cut off the wedge-shaped edge of the block, substantially as described.

In testimony whereof I affix my signature in presence of two witnesses.

WILLIAM H. WYMAN.

Witnesses:
C. T. BENEDICT,
A. E. THOMPSON.